(12) United States Patent
Lindtjørn

(10) Patent No.: US 10,608,427 B2
(45) Date of Patent: Mar. 31, 2020

(54) DC POWER SYSTEM SEGREGATED INTO DIFFERENT PROTECTION ZONES

(71) Applicant: ABB Schweiz AG, Baden (CH)

(72) Inventor: John Olav Lindtjørn, Oslo (NO)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/346,413

(22) PCT Filed: Oct. 30, 2017

(86) PCT No.: PCT/EP2017/077724
§ 371 (c)(1),
(2) Date: Apr. 30, 2019

(87) PCT Pub. No.: WO2018/086927
PCT Pub. Date: May 17, 2018

(65) Prior Publication Data
US 2019/0273376 A1    Sep. 5, 2019

(30) Foreign Application Priority Data
Nov. 10, 2016 (EP) .................................. 16198226

(51) Int. Cl.
*H02H 7/26* (2006.01)
*B63H 23/24* (2006.01)
(Continued)

(52) U.S. Cl.
CPC ............ *H02H 7/268* (2013.01); *B63H 23/24* (2013.01); *H02H 3/05* (2013.01); *H02H 7/125* (2013.01); *H02H 9/02* (2013.01)

(58) Field of Classification Search
CPC .......... H02H 7/268; H02H 7/125; H02H 9/02; B63H 23/24
See application file for complete search history.

(56) References Cited

U.S. PATENT DOCUMENTS

| 4,924,342 A | * | 5/1990 | Lee ........................ H02H 9/001 174/DIG. 17 |
| 8,564,914 B2 | * | 10/2013 | Eisenhauer ............ H02H 7/268 361/20 |

(Continued)

FOREIGN PATENT DOCUMENTS

| WO | 2013127575 A1 | 9/2013 |
| WO | 2014090316 A1 | 6/2014 |

(Continued)

OTHER PUBLICATIONS

European Search Report Application No. 16198226.9 Completed: Apr. 21, 2017; dated: May 4, 2017 5 Pages.

(Continued)

*Primary Examiner* — Pinping Sun
(74) *Attorney, Agent, or Firm* — Whitmyer IP Group LLC

(57) ABSTRACT

A DC power system, having: a main bus, a plurality of power delivery devices configured to be connected to the main bus, a first zone partitioning device, and a control system, wherein the first zone partitioning device is configured to segregate the main bus into a first protection zone which is a section of the main bus to which power delivery devices with a fault clearance requirement in a first time range are configured to be connected, and a second protection zone which is a section of the main bus with a fault clearance requirement in a second time range, which includes times that are higher than any time included in the first time range, and to which no power delivery device with a fault clearance requirement in the first time range is configured to be connected, wherein the control system is configured to control the first zone partitioning device to allow load current to flow from the first protection zone to the second protection zone and to limit fault current flow from the first protection zone to the second protection zone.

19 Claims, 1 Drawing Sheet

(51) Int. Cl.
*H02H 7/125* (2006.01)
*H02H 9/02* (2006.01)
*H02H 3/05* (2006.01)

(56) References Cited

U.S. PATENT DOCUMENTS

| | | | | |
|---|---|---|---|---|
| 8,803,358 | B2* | 8/2014 | Hafner | H02H 7/268 |
| | | | | 307/113 |
| 9,112,347 | B2* | 8/2015 | Berggren | H02H 9/02 |
| 10,310,003 | B2* | 6/2019 | Davidson | G01R 31/086 |
| 2010/0246408 | A1* | 9/2010 | Kerber | H04L 12/437 |
| | | | | 370/242 |
| 2012/0004867 | A1* | 1/2012 | Mousavi | G01R 31/3274 |
| | | | | 702/58 |
| 2013/0270902 | A1* | 10/2013 | Andersen | H02H 7/26 |
| | | | | 307/9.1 |
| 2014/0022680 | A1 | 1/2014 | Berggren et al. | |
| 2014/0361621 | A1 | 12/2014 | Lindtjorn | |
| 2016/0031391 | A1* | 2/2016 | Dong | B60R 16/023 |
| | | | | 307/9.1 |
| 2016/0082907 | A1 | 3/2016 | Dong et al. | |
| 2016/0132089 | A1* | 5/2016 | Tenca | H02H 7/261 |
| | | | | 714/43 |

FOREIGN PATENT DOCUMENTS

| | | | | |
|---|---|---|---|---|
| WO | WO-2015168830 A1 * | 11/2015 | | H02H 3/025 |
| WO | 2016096187 A1 | 6/2016 | | |

OTHER PUBLICATIONS

International Preliminary Report on Patentability Application No. PCT/EP2017/077724 Completed: Nov. 22, 2018 12 Pages.

International Search Report & Written Opinion of the International Searching Authority Application No. PCT/EP2017/077724 Completed: Feb. 5, 2018; dated: Feb. 15, 2018 10 Pages.

* cited by examiner

DC POWER SYSTEM SEGREGATED INTO DIFFERENT PROTECTION ZONES

TECHNICAL FIELD

The present disclosure generally relates to power systems and in particular to a DC power system with redundancy capability.

BACKGROUND

Power systems for powering motors may comprise a plurality of components, such as one or more power generation units, drives line-ups, energy storage modules and a main bus to which the aforementioned components are connectable. For reasons of safety, such systems may be designed with redundancy. This is important in e.g., marine applications, where for example in some applications it is essential that dynamic positioning of a vessel to maintain its position by using its propellers and thrusters can be guaranteed at all times.

At some point a fault, such as a short circuit will inevitably occur in the power system, either in the busbar system, in one of the components of the system, or in a load. In case of a fault, it is important to isolate the fault from the healthy part of the system such that normal power provision can be continued by means of the healthy part, and for protecting the healthy parts from being damaged. For this purpose, a protection system is typically included in the power system. A protection system arranged to handle faults in a power system typically comprise monitoring equipment arranged to monitor electrical parameters such as currents in the power system, and circuit breakers controlled by the monitoring equipment. The circuit breakers are arranged in such a way in the power system that selective fault isolation can be obtained in case of a fault. Existing protection systems can however in some applications be both very expensive and space consuming.

WO2013127575 discloses a DC-power system comprising a main DC bus, a power generating unit arranged to feed the main DC bus, an isolator switch arranged between the main DC bus and the power generating unit for isolating the power generating unit from the main DC bus in case of a main DC bus fault, a drive unit arranged to be fed by the main DC bus, wherein the drive unit comprises a drive unit bus system, converter units connected to the drive unit bus system, and fuses arranged between the drive unit bus system and the converter units for protecting the converter units in case of a drive unit fault. Thereby, the various units in the DC-power system can selectively be protected in case of faults in any of the units or on the main DC bus, without the use of large, space consuming and expensive circuit breakers.

SUMMARY

The present inventor has realized that the protection philosophy disclosed in WO2013127575 may be simplified and that the flexibility of the protection strategy may be improved.

Fuses/semiconductors and isolator switches have different operating speed capabilities. Fault currents from various parts of the system may have a clear transient character, or they may be generated more slowly, depending on the source of the fault current. An example of a transient type of fault current is obtained due to the discharging of capacitors in the converter units connected to the main DC bus. Thus, for example, a fault close to a power generating unit can cause discharging of any capacitors of the converter units.

In view of the above, an object of the present disclosure is to provide a DC power system which solves, or at least mitigates, the problems of the prior art.

There is hence provided a DC power system, comprising: a main bus, a plurality of power delivery devices configured to be connected to the main bus, a first zone partitioning device, and a control system, wherein the first zone partitioning device is configured to segregate the main bus into a first protection zone which is a section of the main bus to which power delivery devices with a fault clearance requirement in a first time range are configured to be connected, and a second protection zone which is a section of the main bus with a fault clearance requirement in a second time range, which includes times that are higher than any time included in the first time range, and to which no power delivery device with a fault clearance requirement in the first time range is configured to be connected, wherein the control system is configured to control the first zone partitioning device to allow load current to flow from the first protection zone to the second protection zone and to limit fault current flow from the first protection zone to the second protection zone.

The first zone partitioning device quickly segregates the second protection zone from the first protection zone in the event of a fault in the second protection zone, whereby transient fault currents arising in the first protection zone can be limited or prevented from flowing into the second protection zone, thereby preventing negative impact on the power delivery devices, such as power converters, in the first protection zone. It furthermore allows for a more flexible approach to protection, where higher performance protection devices may be used in the first protection zone to provide quick fault handling in the first protection zone, and lower performance protection devices may be used in the second protection zone, where a plurality of strategies for fault handling may be utilized.

According to one embodiment the control system is configured to control the first zone partitioning device to allow load current to flow from the first protection zone to the second protection zone and to prevent fault current flow from the first protection zone to the second protection zone.

The first protection zone is characterized by the fact that most power delivery devices in the form of power converters configured to be connected to it has integrated capacitor banks that support the dc link voltage. The power converters depend on these for their operation and if the voltage on these capacitors falls below a certain level the power converters trip on under voltage. The capacitive nature of the dc-link also means that fault currents in this zone have very short time constants and consequently reach high levels within very short time after a fault. This also means that any faults in the first protection zone must be handled extremely quickly to avoid adverse effects on its converters. This environment is ideally suited to solid state circuit breakers and high speed fuses which clear faults in range of a few microseconds to a few milliseconds. The first zone partitioning device ensures that faults outside the particular first protection zone do not immediately cause the converters to trip on under voltage.

The second protection zone is characterized by fault currents with longer time constants and any power converters connected to it are not dependent on capacitor banks on their dc terminals to operate. This means that it is possible to use a slower-acting protection approach in this zone. All entry points from other zone(s) of the main bus into the second protection zone are guarded by zone partitioning devices that can control fault current. This can be used to, according to one example, implement a fold-back protection scheme whereby a sustained fault current triggers a reduction in grid voltage and fault current. The faulty section or component is disconnected from the system and the voltage ramped up again. Faults in this zone are typically cleared in 2-500 ms.

The first protection zone may be a capacitive zone and the second protection zone may be a DC grid zone.

According to one embodiment the control system is configured to control the first zone partitioning device to allow load current and fault current to flow from the second protection zone to the first protection zone.

According to one embodiment the first zone partitioning device is a solid state circuit breaker.

One embodiment comprises a rectifier, wherein at least one of the power delivery devices configured to be connected to the second protection zone is a diesel generator or a gas engine, wherein the diesel generator or gas engine is configured to be connected to the main bus via the rectifier.

According to one embodiment at least one of the power delivery devices is a power converter comprising a capacitor bank, wherein the power converter is configured to be connected to the first protection zone.

According to one embodiment at least one of the power delivery devices configured to be connected to the first protection zone is an energy storage unit.

According to one embodiment at least one of the power delivery devices configured to be connected to the first protection zone is a generator, for example a diesel generator.

According to one embodiment the first time range and the second time range partially overlap.

According to one embodiment the first time range and the second time range are disjoint.

According to one embodiment the first time range includes times ranging from in the order of one micro second to the order of one millisecond.

According to one embodiment the second time range includes times ranging from in the order of one millisecond to the order of hundreds of milliseconds.

One embodiment comprises a bus-tie, wherein the main bus is separable into a first bus section and a second bus section by means of the bus-tie, wherein the first zone partitioning device is configured to segregate the first bus section into the first protection zone and the second protection zone, and wherein the DC power system comprises a second zone partitioning device, wherein the second zone partitioning device is configured to segregate the second bus section into a first protection zone which is a section of the second bus section to which power delivery devices with a fault clearance requirement in the first time range are configured to be connected, and a second protection zone which is a section of the main bus with a fault clearance requirement in the second time range and to which no power delivery device with a fault clearance requirement in the first time range is configured to be connected, wherein the control system is configured to control the second zone partitioning device to allow load current to flow from the first protection zone to the second protection zone and to limit fault current flow from the first protection zone to the second protection zone.

According to one embodiment the control system is configured to control the second zone partitioning device to allow load current to flow from the first protection zone to the second protection zone and to prevent fault current flow from the first protection zone to the second protection zone.

According to one embodiment the control system is configured to control the second zone partitioning device to allow load current and fault current to flow from the second protection zone to the first protection zone.

One embodiment comprises a plurality of disconnecting devices, each disconnecting device being configured to be connected between the main bus and a respective power delivery device to enable disconnection of the power delivery devices from the main bus.

According to one embodiment at least some of the disconnecting devices configured to disconnect power delivery devices configured to be connected to the first protection zone are one of solid state circuit breakers and fuses, for example high-speed fuses.

Disconnecting devices configured to disconnect power delivery devices that are configured to be connected to the second protection zone may be isolator switches, contactors or air circuit breakers.

According to one embodiment the DC power system is an on-board power system of a vessel.

One embodiment comprises a monitoring system which in the event of a fault in the second protection zone is configured to monitor a limited fault current allowed by the first zone partitioning device to flow from the first protection zone to the second protection zone to thereby determine whether the fault has been cleared.

There is according to a second aspect of the present disclosure provided a marine vessel comprising a DC power system according to the first aspect.

According to one embodiment the marine vessel is a dynamic positioning vessel.

Generally, all terms used in the claims are to be interpreted according to their ordinary meaning in the technical field, unless explicitly defined otherwise herein. All references to "a/an/the element, apparatus, component, means, etc., are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

Figure 1:
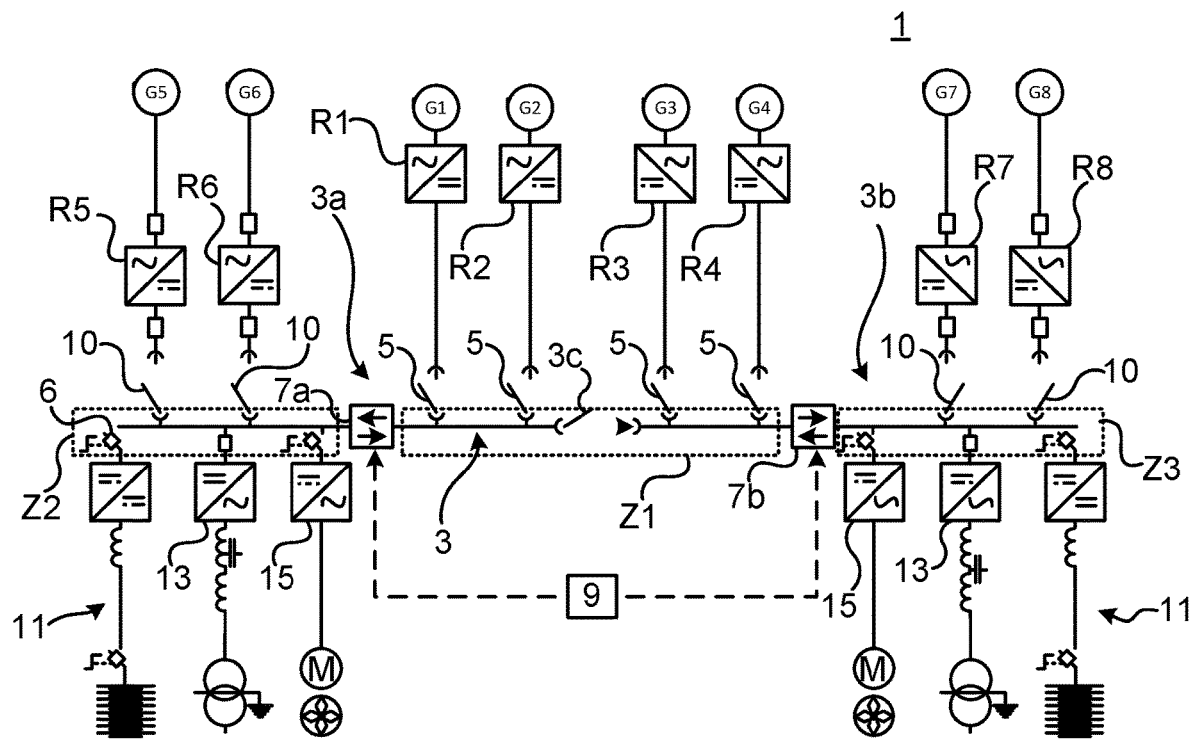
FIG. 1 is a schematic diagram of an example of a DC power system.

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

The present disclose relates to a DC power system which includes a main bus, a plurality of power delivery devices, a plurality of disconnecting devices or protection devices, a control system, and a first zone partitioning device.

Each power delivery device is configured to be connected to the main bus by means of a respective disconnecting device. The disconnecting devices are configured to disconnect the respective power delivery devices from the main bus.

The first zone partitioning device is configured to segregate the main bus into a first protection zone and a second protection zone. The first protection zone and the second protection zone form two types of protection zones.

The first protection zone is one which is characterized by fast fault clearance requirements, and the second protection zone is one which is characterized by slower fault clearance requirements than the first protection zone. The fault clearance requirements are created by the particular power delivery devices configured to be connected to the main bus. A section of the main bus to which power delivery devices with fast fault clearance requirements are configured to be connected is a first protection zone. A section of the main bus to which power delivery devices with slower fault clearance requirements are configured to be connected, and to which no power delivery devices with fast fault clearance requirements are configured to be connected is a second protection zone.

The fault clearance requirement in the first protection zone is within a first time range. The first time range includes times ranging from in the order of one micro second to the order of one millisecond. The fault clearance requirement in the second protection zone is within a second time range, which includes times that are higher than any time included in the first time range. The first time range and the second time range may have a partial overlap, or they may be disjoint. The second time range includes times ranging from in the order of one millisecond to the order of hundreds of milliseconds.

The control system is configured to control the first zone partitioning device to allow load current to flow from the first protection zone to the second protection zone and to limit or prevent fault current to flow from the first protection zone to the second protection zone. The control system may furthermore be configured to control the first zone partitioning device to allow load current and fault current to flow from the second protection zone to the first protection zone.

All entry points from sections of the main bus outside the second protection zone into the second protection zone are guarded by a respective zone partitioning devices, thereby limiting or preventing fault currents to flow from a first protection zone to the second protection zone.

An example of a DC power system will now be described with reference to FIG. 1.

FIG. 1 schematically shows a DC power system 1. The DC power system 1 comprises a main bus 3, namely a main DC bus, also known as a DC grid. The main DC bus 3 has a first bus section 3a, namely a first DC bus section and a second bus section 3b, namely a second DC bus section. The DC power system 1 further comprises a switch 3c, for example a bus-tie, which is arranged to connect and disconnect the first DC bus section 3a and the second DC bus section 3b.

The DC power system 1 comprises power delivery devices G1 to G4 in the form of power generating units. According to the present example power delivery devices G1 and G2 are configured to be connected to the first DC bus section 3a and power delivery devices G3 and G4 are configured to be connected to the second DC bus section 3b.

Each power delivery G1 to G4 may for example be an AC power source, e.g., a diesel generator or a gas engine. The DC power system 1 may thus comprise a plurality of rectifiers R1 to R4, one rectifier R1 to R4 for each power delivery device G1 to G4. Each rectifier R1 to R4 is configured to be connected to a respective power delivery device G1 to G4 and to the main bus 3. Each rectifier R1 to R4 thus has terminals configured to be connected to a respective power delivery device G1 to G4 and terminals configured to be connected to the main bus 3.

The DC power system 1 comprises disconnecting devices 5 such as air circuit breakers, disconnectors, or contactors, for selectively disconnecting a respective one of the rectifiers R1-R4, and thus the power delivery devices G1-G4 from the main bus 3.

The main bus 3 is configured to be segregated into different protection zones referred to as second protection zone and first protection zone. The segregation is provided by means of zone partitioning devices, as will be described in more detail in the following.

The section of the main bus 3 to which the power delivery devices G1-G4 are configured to be connected is the second protection zone Z1. Here only power delivery devices with longer fault clearance requirements are configured to be connected to the main bus 3. Thus, no power converters comprising integrated capacitor banks are connected to or configured to be connected to the second protection zone Z1.

The exemplified DC power system 1 also comprises a plurality of power delivery devices G5 to G8 and 11-15, at least some of them having fast fault clearance requirements, configured to be connected to a respective first protection zone Z2 and Z3. The DC power system 1 also comprises a plurality of disconnecting devices 6 configured to be connected between a respective power delivery device 11-15 and the main bus 3, and a plurality of disconnecting devices 10 configured to be connected between the main bus 3 and respective power delivery devices G5 to G8. The disconnecting devices 6, 10 are configured to selectively disconnect a respective one of the power delivery devices G5-G8 and 11-15, respectively, from the main bus 3.

The exemplified power delivery devices G5 to G8 are AC power generating units, e.g., diesel generators or gas engines. The exemplified DC power system 1 therefore comprises rectifiers R5-R8, and the power delivery devices G5 to G8 are configured to be connected to the main bus 3 via a respective rectifier R5-R8. Rectifiers R5-R8 may be provided with switchable rectifier bridges, for example thyristor-based rectifier bridges, able to block fast transient fault currents from discharging of capacitors in the event of e.g., a rectifier fault or power delivery device fault. Power delivery devices G5-G8 are hence configured to be installed in a fast-transient fault current environment.

The DC power system 1 further comprises a first zone partitioning device 7a which segregates the main bus 3 into the second protection zone Z1 and first protection zone Z2, and a second zone partitioning device 7b which segregates the main bus 3 into the grid zone Z1 and first protection zone Z3.

The first zone partitioning device 7a and the second zone partitioning device 7b may for example be solid state circuit breakers.

The DC power system 1 also includes a control system 9 configured to control the first zone partitioning device 7a and the second zone partitioning device 7b. In particular, the control system 9 is configured to control the first zone partitioning device 7a to allow load current to flow from the first protection zone Z2 to the second protection zone Z1 and to limit or prevent fault current to flow from the first protection zone Z2 to the second protection zone Z1. The control system 9 may additionally be configured to control the first zone partitioning device 7a to allow load current and fault current to flow from the second protection zone Z1 to the first protection zone Z2.

The control system 9 is further configured to control the second zone partitioning device 7b to allow load current to flow from the first protection zone Z3 to the second protection zone Z1 and to limit or prevent fault current to flow from the first protection zone Z3 to the second protection zone Z1. The control system 9 may additionally be configured to control the second zone partitioning device 7b to allow load current and fault current to flow from the second protection zone Z1 to the first protection zone Z3.

The control system 9 may thus be configured to obtain or receive measurements or estimates of currents flowing in the system or other electrical parameters such as voltages, and in the event a fault is detected, the control system 9 controls the zone partitioning devices 7a and 7b accordingly.

The power delivery devices 11 configured to be connected to the first bus section 3a and the second bus section 3b of the main bus 3, are exemplified by a system comprising an energy storage unit, such as a battery, and a DC/DC converter, and are thus connected to the first protection zone Z2 and first protection zone Z3, respectively.

Power delivery devices 13 and 15 are inverters, configured to feed e.g., a motor M. Any of the converters of the power delivery devices 11-15 may comprise an integrated capacitor bank that is configured to support the DC link voltage. It is these capacitor banks that cause fast transients when the capacitors discharge in the event of a fault.

Figure 2:
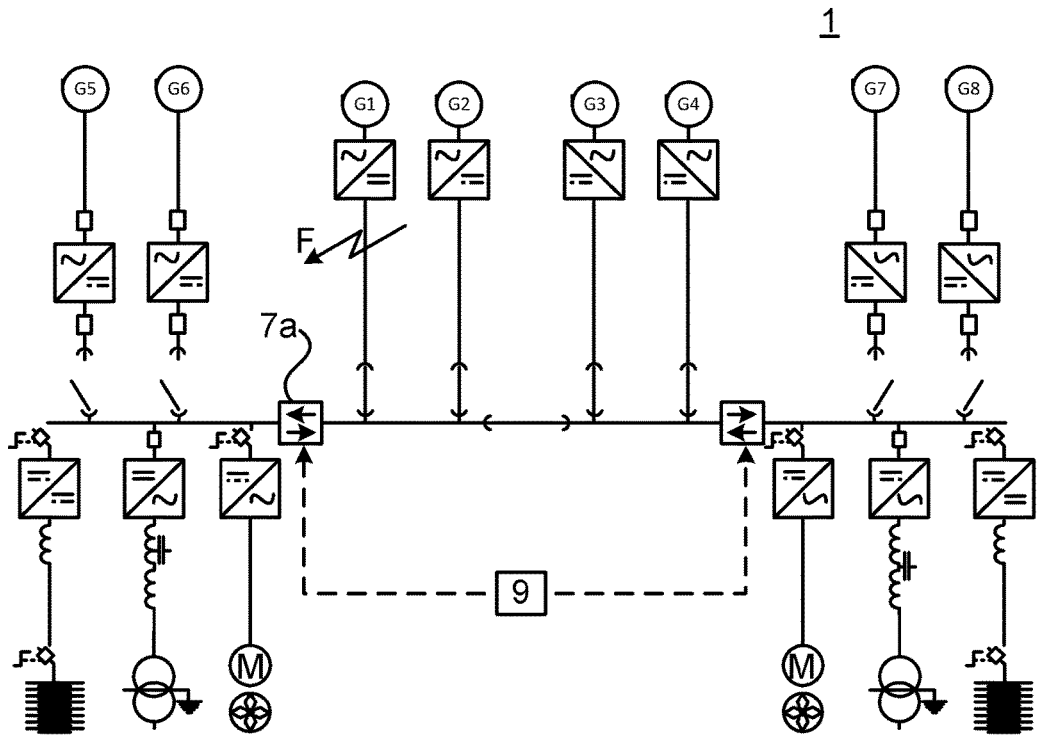
FIG. 2 schematically shows one example of operation of the DC power system in FIG. 1.

FIG. 2 shows an example of a situation in which a fault F occurs in the proximity of power delivery device G1. There are a number of strategies of how to handle a fault of this type, as for example disclosed in WO2013127575, and fault-handling strategies will therefore not be described in any detail herein. Returning now to the example in FIG. 2, the bus-tie 3c may be opened, in case the first bus section 3a and the second bus section 3b have previously been connected to disconnect the second bus section 3b from the fault. Furthermore, the control system 9 will in this case send control signals to the first zone partitioning device 7a, which as a result will block or limit fault currents from flowing from the first protection zone Z2 into the second protection zone Z1. The fault F may then be handled in accordance with the lower fault clearance requirements in the second protection zone Z1.

According to one example the DC power system may comprise a monitoring system which in the event of a fault in a second protection zone is configured to monitor the limited fault current allowed by the respective zone partitioning device(s) to flow from the first protection zone(s) to a second protection zone to thereby determine whether the fault has been cleared or not. By allowing a limited amount of fault current from the first protection zone(s) to flow to a fault, detection of whether the fault has been cleared or not may be facilitated.

It should be noted that the herein described zone partitioning, exemplified above with 2-split system, may also be implemented for DC power system that has three or four splits, i.e., sections connectable by e.g., a bus-tie. There can also be multiple second protection zones and first protection zones per section.

It should furthermore be noted that the control system may comprise a plurality of controllers, each controller being configured to control a respective zone partitioning device.

The DC power system may according to one example have a second protection zone to which no power delivery devices are connected directly. In this case, the second protection zone may be essentially empty, in the sense that no power delivery device is configured to be connected directly to the second protection zone, only via zone partitioning devices. There may still be benefits in this type of configuration, due to disconnecting devices that may be present in the second protection zone, such as a bus-tie and isolator switches connected between the zone protection devices and the second protection zone. These disconnecting devices may then flexibly be selected to be cheaper and/or of slower type, unable to handle fast transients, if desired. It may therefore be beneficial to segregate or subdivide the main bus into different protection zones, i.e., first protection zone(s) and second protection zone(s) also in this case. In this set-up, at least one first protection zone may in addition to power converters include power delivery devices in the form of for example diesel generators and/or gas engines to provide power to the system.

The DC power systems described herein may advantageously be used as an on-board power system for powering a marine vessel, for example for marine vessels utilizing dynamic positioning. Examples of such vessels are cable-laying vessels, drillships, floating production storage and offloading units (FPSO), semi-submersibles, and oil platforms. The present power system is typically used in a low voltage environment, although higher voltage applications, e.g., medium voltage, are also envisaged.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A DC power system, comprising:
a main bus,
a plurality of power delivery devices configured to be connected to the main bus,
a first zone partitioning device, and
a control system,
wherein the first zone partitioning device is configured to segregate the main bus into a first protection zone and a second protection zone, wherein the first protection zone is a section of the main bus to which a first group of power delivery devices with a fault clearance requirement in a first time range are configured to be connected, and wherein the second protection zone is a section of the main bus to which power delivery devices with a fault clearance requirement in a second time range, which includes times that are higher than any time included in the first time range, are configured to be connected and to which the first group of power delivery devices with the fault clearance requirement in the first time range is not configured to be connected,
wherein the control system is configured to control the first zone partitioning device to allow flow of load current from the first protection zone to the second protection zone and to limit flow of fault current from the first protection zone to the second protection zone.

2. The DC power system as claimed in claim 1, wherein the control system is configured to control the first zone partitioning device to allow load current and fault current from the second protection zone to the first protection zone.

3. The DC power system as claimed in claim 1, wherein the first zone partitioning device is a solid state circuit breaker.

4. The DC power system as claimed in claim 1, comprising a power delivery device with a fault clearance requirement in the second time range and a rectifier, wherein the power delivery device is configured to be connected to the second protection zone via the rectifier.

5. The DC power system as claimed in claim 1, wherein at least one of the first group of power delivery devices is a power converter having a capacitor bank, wherein the power converter is configured to be connected to the first protection zone.

6. The DC power system as claimed in claim 1, wherein the first time range and the second time range partially overlap.

7. The DC power system as claimed in claim 1, wherein the first time range and the second time range are disjoint.

8. The DC power system as claimed in claim 1, wherein the first time range includes times ranging from in the order of one micro second to the order of one millisecond.

9. The DC power system as claimed in claim 1, wherein the second time range includes times ranging from in the order of one millisecond to the order of hundreds of milliseconds.

10. The DC power system as claimed in claim 1, comprising a bus-tie, wherein the main bus is separable into a first bus section and a second bus section by means of the bus-tie, and
wherein the DC power system includes a second zone partitioning device, wherein the second zone partitioning device is configured to segregate the second bus section into third protection zone, wherein the third protection zone is a section of the second bus section to which a second group of power delivery devices with a fault clearance requirement in the first time range are configured to be connected, and wherein the second protection zone is the section of the main bus with the fault clearance requirement in the second time range, and to which the second group of power delivery devices with the fault clearance requirement in the first time range is not configured to be connected, wherein the control system is configured to control the second zone partitioning device to allow flow of load current from the third protection zone to the second protection zone and to limit flow of fault current from the third protection zone to the second protection zone.

11. The DC power system as claimed in claim 10, wherein the control system is configured to control the second zone partitioning device to allow flow of load current and fault current from the second protection zone to the third protection zone.

12. The DC power system as claimed in claim 1, comprising a plurality of disconnecting devices, each disconnecting device being configured to be connected between the main bus and a respective power delivery device to enable disconnection of the plurality of power delivery devices from the main bus.

13. The DC power system as claimed in claim 12, wherein at least some of the disconnecting devices configured to disconnect the first group and the second group of power delivery devices are one of solid state circuit breakers and fuses.

14. A DC power system, comprising:
a main bus,
a plurality of power delivery devices configured to be connected to the main bus,
a first zone partitioning device, and
a control system,
wherein the first zone partitioning device is configured to segregate the main bus into a first protection zone and a second protection zone, wherein the first protection zone is a section of the main bus to which power delivery devices with a fault clearance requirement in a first time range are configured to be connected, and wherein the second protection zone is a section of the main bus to which power delivery devices with a fault clearance requirement in a second time range, which includes times that are higher than any time included in the first time range, are configured to be connected and to which the power delivery devices with the fault clearance requirement in the first time range are not configured to be connected,
wherein the control system is configured to control the first zone partitioning device to allow flow of load current from the first protection zone to the second protection zone and to limit flow of fault current from the first protection zone to the second protection zone; and
a monitoring system which in the event of a fault in the second protection zone is configured to monitor a limited fault current allowed by the first zone partitioning device to flow from the first protection zone to the second protection zone to thereby determine whether the fault has been cleared.

15. The DC power system as claimed in claim 2, wherein the first zone partitioning device is a solid state circuit breaker.

16. The DC power system as claimed in claim 2, comprising a power delivery device with a fault clearance requirement in the second time range and a rectifier, wherein the power delivery device is configured to be connected to the second protection zone via the rectifier.

17. The DC power system as claimed in claim 2, wherein at least one of the first group of power delivery devices is a power converter having a capacitor bank, wherein the power converter is configured to be connected to the first protection zone.

18. A marine vessel comprising a DC power system comprising:
a main bus,
a plurality of power delivery devices configured to be connected to the main bus,
a first zone partitioning device, and
a control system,
wherein the first zone partitioning device is configured to segregate the main bus into a first protection zone and a second protection zone, wherein the first protection zone is a section of the main bus to which power delivery devices with a fault clearance requirement in a first time range are configured to be connected, and wherein the second protection zone is a section of the main bus to which power delivery devices with a fault clearance requirement in a second time range, which includes times that are higher than any time included in the first time range, are configured to be connected and to which the power delivery devices with the fault clearance requirement in the first time range are not configured to be connected,
wherein the control system is configured to control the first zone partitioning device to allow flow of load current from the first protection zone to the second protection zone and to limit flow of fault current from the first protection zone to the second protection zone.

19. The marine vessel as claimed in claim 18, wherein the marine vessel is a dynamic positioning vessel.

* * * * *